United States Patent
Jung et al.

(10) Patent No.: US 8,104,279 B2
(45) Date of Patent: Jan. 31, 2012

(54) METHOD AND DEVICE FOR DETERMINING AN OPERATING CHARACTERISTIC OF AN INJECTION SYSTEM

(75) Inventors: Uwe Jung, Wörth a. d. Donau (DE); Hans-Peter Rabl, Kelheim (DE); Janos Radeczky, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 488 days.

(21) Appl. No.: 12/445,083

(22) PCT Filed: Oct. 10, 2007

(86) PCT No.: PCT/EP2007/060764
§ 371 (c)(1), (2), (4) Date: Apr. 10, 2009

(87) PCT Pub. No.: WO2008/043784
PCT Pub. Date: Apr. 17, 2008

(65) Prior Publication Data
US 2010/0101544 A1    Apr. 29, 2010

(30) Foreign Application Priority Data
Oct. 11, 2006   (DE) .......................... 10 2006 048 227

(51) Int. Cl.
*F02D 23/00*   (2006.01)
(52) U.S. Cl. .......................................... 60/601; 60/602
(58) Field of Classification Search ............ 60/601–602; 123/559.1; 73/114.45
See application file for complete search history.

(56) References Cited

U.S. PATENT DOCUMENTS

| | | | | |
|---|---|---|---|---|
| 6,145,486 A * | 11/2000 | Aikawa | ..................... | 123/179.17 |
| 6,304,815 B1 * | 10/2001 | Moraal et al. | .................. | 701/115 |
| 6,314,735 B1 * | 11/2001 | Kolmanovsky et al. | ......... | 60/602 |
| 6,397,587 B1 * | 6/2002 | van Nieuwstadt et al. | ..... | 60/297 |
| 6,408,624 B1 * | 6/2002 | Books et al. | .................... | 60/601 |
| 6,418,719 B2 * | 7/2002 | Terry et al. | ...................... | 60/602 |
| 6,865,885 B2 * | 3/2005 | Kitahara | ......................... | 60/297 |
| 6,877,366 B2 | 4/2005 | Rabl | | |
| 7,137,253 B2 * | 11/2006 | Furman et al. | .................. | 60/608 |
| 2005/0016266 A1 | 1/2005 | Rabl | | |

FOREIGN PATENT DOCUMENTS

| | | |
|---|---|---|
| DE | 19541774 A1 | 5/1997 |
| DE | 19927901 A1 | 12/2000 |
| DE | 10305523 A1 | 8/2004 |
| EP | 1574694 A1 | 9/2005 |
| EP | 1576270 B1 | 6/2006 |
| FR | 2898936 A1 | 9/2007 |
| JP | 2000345889 A | 12/2000 |

* cited by examiner

*Primary Examiner* — Thanh Lam
(74) *Attorney, Agent, or Firm* — King & Spalding L.L.P.

(57) ABSTRACT

In a method and a device for determining an operating characteristic of an injection system, to determine an operating characteristic (30) of an internal combustion engine (1) that is charged by a turbocharger (4), the method has the following steps: A) carrying out a pilot injection of fuel into a cylinder (51, 52, 53, 54) of the internal combustion engine using the injection system (30); B) determining an operating parameter of the turbocharger (40); C) determining an operating characteristic of the injection system (30) using the operating parameter of the turbocharger (40) previously determined.

20 Claims, 3 Drawing Sheets

US 8,104,279 B2

METHOD AND DEVICE FOR DETERMINING AN OPERATING CHARACTERISTIC OF AN INJECTION SYSTEM

CROSS-REFERENCE TO RELATED APPLICATIONS

This application is a United States national phase filing under 35 U.S.C. §371 of International Application No. PCT/EP2007/060764, filed Oct. 10, 2007 which claims priority to German Patent Application No. 10 2006 048 227.1, filed Oct. 11, 2006. The complete disclosure of the above-identified application is hereby fully incorporated herein by reference.

TECHNICAL FIELD

The present invention relates to a method for determining an operating characteristic of an injection system of an internal combustion engine and to a controller for carrying out the method.

BACKGROUND

In modern internal combustion engines, precisely attaining a designated fuel injection quantity is critical for obtaining optimal exhaust gas emission values. Moreover, in the case of multi-cylinder engines efforts are also directed at ensuring that as far as possible the same amount of fuel is injected into all the cylinders in order to achieve the quietest and most consistent engine operation possible. In this case the injection pattern on which the injected fuel quantity is based should be homogeneous, i.e. the same number of pilot, main and post injections per cylinder. If, for example, the injection pattern for each cylinder consists of a single main injection per combustion cycle, the aim is to ensure that for a predetermined operating point of the internal combustion engine not only the relative injection times (an injection time is normally specified as a function of the crank angle position of the piston), but also the injection quantities per injection are kept the same for all cylinders.

Achieving a predetermined injection quantity is made difficult due to manufacturing tolerances of individual components and controllers of the injection system. In particular, injectors can have manufacturing tolerances which result in different injection quantities even given identical operating parameters and ambient conditions. Furthermore, the components—the injectors in particular should once again be mentioned in this context—undergo a change in their operating characteristics in the course of their useful life and consequently in the effectively achieved injection quantities if no countermeasures are taken. The change in the operating characteristic of a component over the course of its lifetime is also referred to as drift.

SUMMARY

In order to counter the problems of manufacturing tolerances and drift, in order, for example, to achieve identical injection patterns for all cylinders, it is desirable to adjust the injection parameters of the injectors individually for each of the cylinders. To that end, however, information relating to the current operating characteristic of the respective injector must be known. According to various embodiments, an operating characteristic of an injection device of an internal combustion engine can be determined.

According to an embodiment, a method for determining an operating characteristic of an injection system of an internal combustion engine, wherein the internal combustion engine includes a turbocharger, may comprise the method steps: A) Perform a test injection of fuel into a cylinder of the internal combustion engine by means of the injection system; B) determine an operating parameter of the turbocharger; and C) determine an operating characteristic of the injection system on the basis of the determined operating parameter of the turbocharger.

According to a further embodiment, the operating parameter of the turbocharger may be a rotation parameter, preferably a turbocharger rotational speed or a variable which can be derived from a turbocharger rotational speed. According to a further embodiment, the operating characteristic of the injection system may be an injection quantity or a variable which can be derived from an injection quantity, in particular a control parameter of the injection system. According to a further embodiment, the method steps A) to C) can be performed for a plurality of test injections. According to a further embodiment, the test injection or the test injections may be performed in a torque-neutral manner. According to a further embodiment, a calibration of the injection system may be carried out on the basis of the determined operating parameter. According to a further embodiment, a deviation of the determined operating parameter from a target value can be used in order to achieve the same or a different target value with greater precision in a subsequent injection. According to a further embodiment, the method can be performed for a plurality of cylinders of the internal combustion engine, preferably for all cylinders of the internal combustion engine. According to a further embodiment, the method can be used in order to achieve maximally homogeneous injection patterns into different cylinders.

According to another embodiment, a device for determining an operating characteristic of an injection system, may have: a) an injector-side interface for controlling an injection system, in particular for triggering a test injection into a cylinder of the internal combustion engine; b) a turbocharger-side interface for receiving an operating parameter of the turbocharger; c) an electronic circuit which is embodied in such a way that an operating characteristic of the injection system can be determined on the basis of the operating parameter received on the turbocharger side.

According to a further embodiment, the operating parameter of the turbocharger may be a rotation parameter, preferably a turbocharger rotational speed or a variable which can be derived from a turbocharger rotational speed. According to a further embodiment, the operating characteristic of the injection system can be an injection quantity or a variable which can be derived from an injection quantity, in particular a control parameter of the injection system. According to a further embodiment, the test injection can be performed in a torque-neutral manner. According to a further embodiment, the electronic circuit can be embodied in such a way that a calibration of the injection system can be carried out on the basis of the determined operating parameter. According to a further embodiment, a deviation of the determined operating parameter from a target value can be used in order to achieve the same or a different target value with greater precision in a subsequent injection, in particular in order to achieve a designated fuel injection quantity with greater precision in the subsequent injection. According to a further embodiment, test injections into a plurality of cylinders of the internal combustion engine, preferably into all cylinders of the internal combustion engine, can be performed by means of the electronic control system. According to a further embodiment, the electronic circuit can be embodied in such a way that the injection system can be controlled by means of the electronic control system in such a way that, taking the determined operating characteristic into account, a maximally homogeneous injection pattern can be achieved for different cylinders, preferably for all cylinders of the internal combustion engine.

According to yet another embodiment, an internal combustion engine may comprise an engine block, an injection system, a turbocharger, a turbocharger measuring device and the electronic control system as described above.

BRIEF DESCRIPTION OF THE DRAWINGS

The invention is explained in more detail below with reference to the drawings, in which.

DETAILED DESCRIPTION

Figure 1:
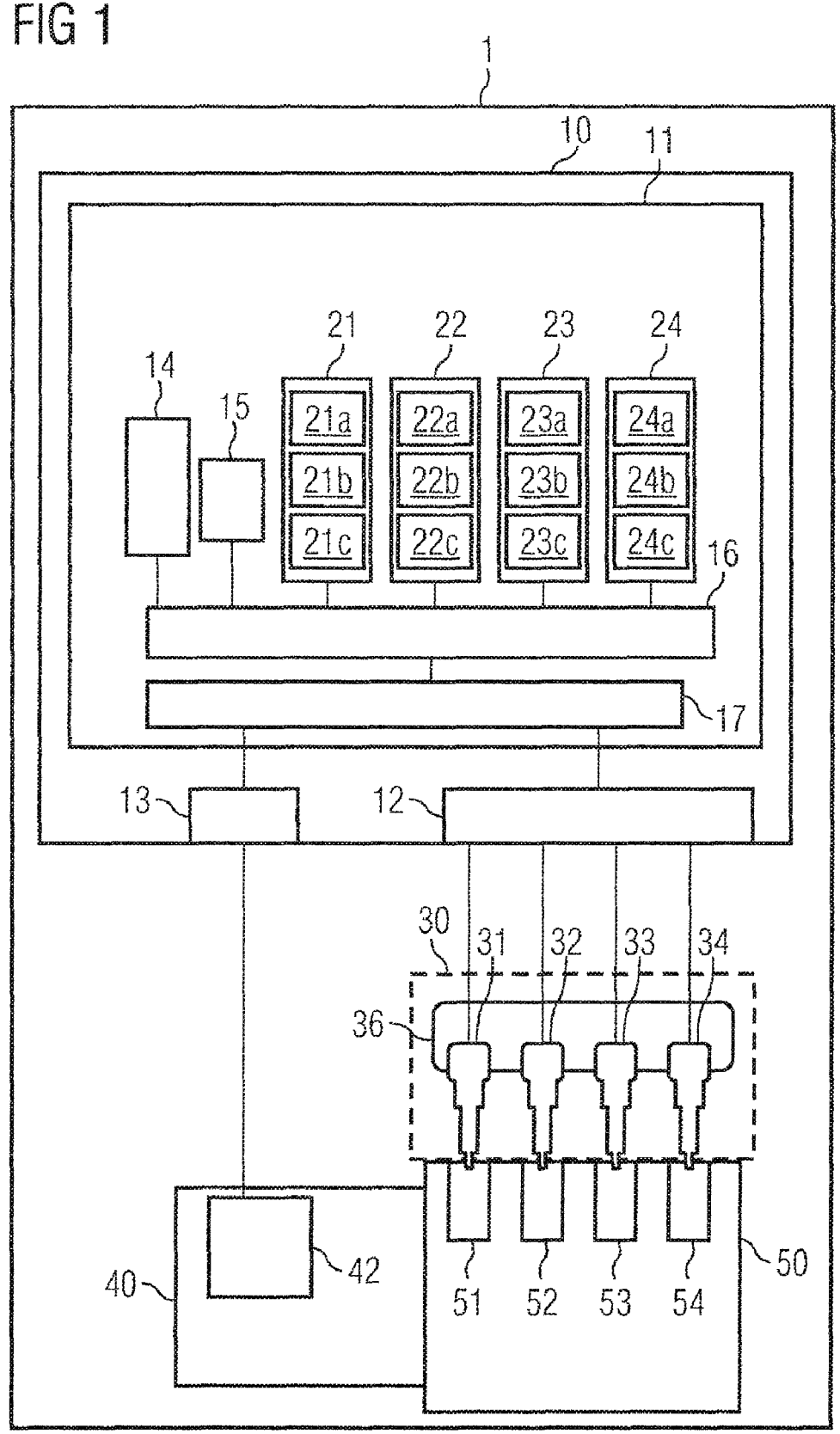
FIG. 1 shows a simplified engine.

Proceeding on the basis of an internal combustion engine which comprises an injection system and a turbocharger, a test injection of fuel into a cylinder of the internal combustion engine is performed by means of the injection system. An operating parameter of the turbocharger is determined. An operating characteristic of the injection system is determined on the basis of the determined operating parameter of the turbocharger.

The test injection causes a change in the energy content—in particular the temperature and the outflow velocity from the cylinder—of the exhaust gases which drive the turbocharger. The change in energy content is reflected in changed operating parameters of the turbocharger. Thus, operating parameters such as, for example, the temperature or rotation parameters of the turbocharger will normally change as a result of the test injection. The term "rotation parameters" includes in particular the rotational speed, the angular momentum and the torque of the turbocharger. The change in an operating parameter can be used to draw conclusions about the injection system. In particular the manufacturing tolerances and drift of an injector by means of which the test injection was performed can be detected, measured and if necessary corrected.

If the test injection produces, for example, a higher than average rotational speed of the turbocharger for a predetermined activation duration of an injector, then it can be concluded that said injector allows a greater than average injection quantity into the cylinder. This purely qualitative deduction already constitutes a useful operating characteristic of the injector. It can be used for example by means of a control loop in which the operating parameter of the turbocharger is fed back by means of negative feedback to the injector in order to control the injector and achieve a designated injection quantity with greater precision.

However, the operating characteristic of the injection system can also be a quantitative variable, for example an injection quantity or a variable which can be derived from an injection quantity. This is then determined on the basis of the operating parameter of the turbocharger. A quantitative operating characteristic of this kind can be determined in a variety of ways, however. One possibility for this is a thermodynamic simulation of the internal combustion engine in an electronic control system. For example, the injection quantity of the test injection is determined in this case on the basis of the change in rotational speed of the turbocharger. Performing a thermodynamic simulation is not the only possible way of determining the operating characteristic of the injection system, however. The effect of an injected test quantity of fuel on the operating parameter of the turbocharger can also be determined in advance in a test or in a simulation and stored in an engine characteristic map assigned to an electronic control system. The quantitative value of the operating parameter (a change in rotational speed, for example) which can be attributed to a test injection can then be transmitted to the electronic control system during the regular operation of the internal combustion engine. The electronic control system then only needs to read out, for example, the value "injection quantity" corresponding to the determined operating parameter from the engine characteristic map. The advantage of engine characteristic maps as opposed to the thermodynamic simulation naturally lies in the fact that the computational overhead can be reduced quite substantially.

The term "operating characteristic" includes not only the qualitative and quantitative variables cited by way of example above. Instead of determining the injected fuel quantity in an engine characteristic map on the basis of, for example, a measured turbocharger rotational speed, a mapping of an operating parameter of the turbocharger directly onto a control parameter of the injection system, for example, can also be stored in the engine characteristic map. For example, the engine characteristic map can include a mapping of a change in the turbocharger rotational speed onto an activation duration or a correction of the activation duration of the injector which performed the test injection. A shorter activation duration, for example, is then synonymous with an injector which has a high fuel throughput due to manufacturing tolerance and/or drift. The activation duration of the injector, together with its correction, therefore likewise represents an operating characteristic of the injection system for example.

The term "operating parameter of the turbocharger" also includes changes to an operating parameter and deviations from a target value, for example a deviation in the change in the rotational speed from a target value which would be expected as a result of a test injection.

The injection quantity or a variable which can be derived from an injection quantity can be determined with greater precision by performing a plurality of test injections. In this case the rotational speed of the turbocharger or a variable related to the rotational speed can be measured for example shortly after each test injection. The injection quantity or the variable which can be derived from the injection quantity can then be determined more precisely using statistical methods, by averaging for example.

However, it is also possible to perform a plurality of test injections and determine only the overall effect of the test injections on a rotation parameter of the turbocharger. This enables in particular drifts and manufacturing tolerances in the dynamics of the opening and closing operation of an injector to be determined more precisely. The test injections are preferably performed in quick succession.

In a further embodiment the test injection or test injections is or are performed in a torque-neutral manner in relation to a crankshaft driven by the internal combustion engine. By this is meant that the injection is performed in such a way that it does no work or at least substantially no work at the cylinder piston. This results in the advantage that the entire energy of the injection is fed to the heat and the outflow velocity of the exhaust gases. This enables the operating characteristic of the injection system to be determined more accurately and more easily. Torque-neutral injections can be performed in particular by way of a suitable selection of the injection time. For many internal combustion engines an injection time of this kind is given for example close to bottom dead center, just before the exhaust valve is closed.

The various embodiments may be operable in such a way that the method is performed continuously during the operation of the internal combustion engine. However, since the drift of modern injection systems progresses relatively slowly, it may be particular advantageous to perform the method, according to various embodiments, at time intervals for calibrating the injection system.

In a further embodiment the method can also be used to achieve the same or a different target value, in particular a target injection quantity, in a subsequent injection with greater precision by means of a deviation of the determined operating parameter from a target value.

In a further embodiment the method is performed for a plurality of cylinders of the internal combustion engine, preferably for all cylinders of the internal combustion engine. Homogeneous injection patterns can then be achieved for all cylinders by means of a suitable individual activation of the injectors, thereby producing a particularly quiet operation of the internal combustion engine.

FIG. 1 shows an engine 1 in one embodiment. The engine 1 comprises an engine control unit (ECU) 10, an injection system 30, a turbocharger 40 and an engine block 50.

The injection system 30 is embodied as a common-rail system. It comprises a pressure accumulator 36 and four injectors 31, 32, 33, 34 connected to the pressure accumulator 36.

The engine block 50 comprises four cylinders 51, 52, 53, 54. Each of the cylinders 51, 52, 53, 54 is assigned one of the injectors 31, 32, 33, 34.

The turbocharger 40, which can be driven by means of combustion gases being discharged from the cylinders 51, 52, 53, 54 and through which compressed air can be introduced into the combustion chambers of the cylinders 51, 52, 53, 54, is connected to the engine block 50. The turbocharger 40 includes a turbocharger measuring device 42 which measures the rotational speed of a turbine (not shown further here) of the turbocharger 40.

The ECU 10 comprises an electronic circuit 11, an injector-side interface 12 and a turbocharger-side interface 13. The ECU 10 is connected to the turbocharger measuring device 42 via the turbocharger-side interface 13. The ECU 10 is connected to each of the injectors 31, 32, 33, 34 via the injector-side interface 12.

The electronic circuit 11 comprises an engine characteristic map 14, a memory area 15 for storing parameters of test injections, memory areas 21, 22, 23, 24 for determining and storing operating characteristics of the injection system 30, a logic circuit 16, and an analog/digital converter (AD converter) 17.

The memory area 21 permits read and write access and is provided for determining and storing an operating characteristic of the injector 31. It includes a memory area 21a for storing a rotational speed without test injection, a memory area 21b for storing a rotational speed with test injection via the injector 31, and a memory area 21c for storing a change in rotational speed. The memory areas 22, 23, 24 are provided in similar fashion for determining and storing an operating characteristic of the respective remaining injectors 32, 33, 34 and in similar fashion include the memory areas 22a, 22b, 22c, 23a, 23b, 23c, 24a, 24b, 24c.

The engine characteristic map 14 can be embodied as a simple mapping of a change in rotational speed onto a correction of the activation duration. In a preferred embodiment, however, the engine characteristic map 14 is embodied as a multidimensional mapping of change in rotational speed of the turbocharger 40 and operating points of the internal combustion engine onto a correction of the activation duration of the injectors. The engine characteristic map 14 is measured and initialized in tests or simulations prior to the regular operation of the internal combustion engine. For the embodiment discussed here, the engine characteristic map 14 will normally not need to be changed during the entire lifetime of the internal combustion engine.

Values of the start time and the activation duration of a test injection are stored in crank angle degrees in the memory area 15. Said values are preferably chosen such that a torque-neutral test injection results. Said memory area 15 can be embodied as a pure read-only access memory.

The principle of operation of the exemplary embodiment of FIG. 1 is explained in more detail below with reference to the injection schemes shown in FIG. 2 to FIG. 5. In this case FIGS. 2-5 show the timing sequence of injections which are performed by the four injectors 31, 32, 33, 34. The time t is in each case plotted on the abscissa, while the ordinate m represents the injection quantity of an injection. In this case an injection 31r denotes a regular injection of the injector 31. In an analogous manner the injections 32r, 33r, 34r each signify regular injections of the injectors 32, 33, 34. m0 designates a predetermined target injection quantity for a predetermined operating point of the internal combustion engine.

Figure 2:
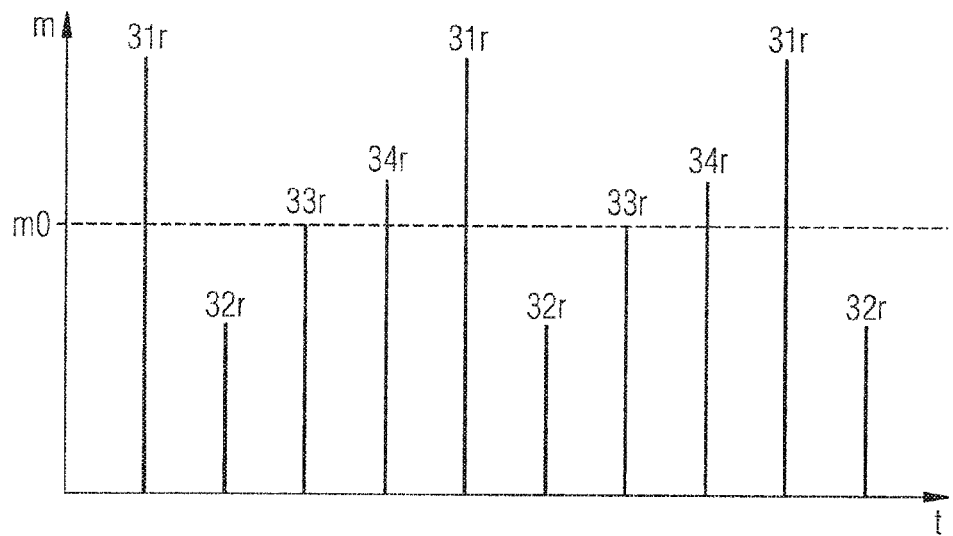
FIG. 2 shows injection patterns for four injectors which have manufacturing tolerances.

FIG. 2 shows the sequence of injections into the four cylinders 51, 52, 53, 54 at a constant operating point of the internal combustion engine, preferably during idling. With reference to FIG. 2 it can be seen that due to manufacturing tolerances and/or drift the injectors 31, 32, 34, deliver injection quantities differing from the target value. Owing to said manufacturing tolerances and drift, different injectors can produce different injection quantities even subject to the prerequisite of identical activation of the injectors. As shown in FIG. 2, the injection quantities of the injectors 31, 34 are too great in relation to the target injection quantity m0, while the injection quantity of the injector 32 is too low. Only injector 33 delivers the correct injection quantity. For the constant operating point and the injection pattern shown in FIG. 2 a first rotational speed of the turbocharger 40 is measured first by the turbocharger measuring device 42 and stored in the memory area 21a. The internal combustion engine 1 then transitions to an operating mode with an injection pattern corresponding to that in FIG. 3.

Figure 3:
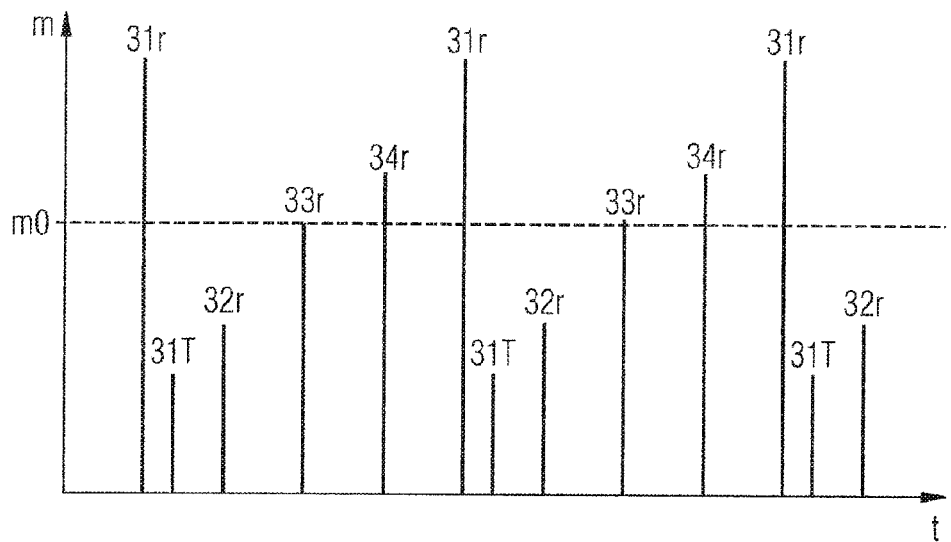
FIG. 3 shows injection patterns for four injectors with a test injection in the case of one injector.

FIG. 3 shows the sequence of injections into the four cylinders 51, 52, 53, 54 at the same operating point of the internal combustion engine as in FIG. 2. The four injectors 31, 32, 33, 34 are controlled in such a way that the regular injections 31r, 32r, 33r, 34r are performed exactly the same as in FIG. 2. In addition, however, the injector 31 performs a test injection 31T. For the test injection, the injector 31 is controlled by the ECU 10 using the constant control parameters that are stored in the memory area 15. The test injection is performed in a torque-neutral manner. The test injection effects a change in the rotational speed of the turbocharger 40. As soon as the turbocharger 40 has reached a stationary operating state, a second rotational speed is measured by the turbocharger measuring device 42 and stored in the memory area 21b.

Next, the change in rotational speed is calculated by the logic circuit 16 by forming the difference between the first and the second rotational speed and stored in the memory area 21c. In the example shown in FIG. 3 the rotational speed will change by a greater than average amount due to the test injection 31T performed by the injector 31, since the injector 31 injects a greater than average quantity of fuel in the case of a fixed activation duration. As a result the calculated change in rotational speed for the injector 31 will be greater than a predetermined change in target rotational speed.

For the calculated change in rotational speed a value for a correction of the activation duration is read out from the engine characteristic map 14. In the cited example of the injector 31 the activation duration must be shortened. With the aid of the value stored in the memory area 21c for the correction of the activation duration the logic circuit 16 adjusts the activation duration of the injector 31 in such a way that the target injection quantity m0 for the injector 31 is achieved.

The correction of the activation duration can be stored for example as a factor by which the original activation duration must be multiplied. In a simpler variant the engine characteristic map 14 is embodied as a pure mapping of the change in rotational speed onto the correction of the activation duration. However, an engine characteristic map 14 of this kind leads to a precise correction only for that operating point for which the engine characteristic map was also measured previously. In other operating points it represents only an approximation of the optimal correction of the activation duration. In a preferred embodiment the engine characteristic map 14 is therefore stored as a multidimensional engine characteristic map which maps the load of the internal combustion engine, the rotational speed of the internal combustion engine and the change in rotational speed of the turbocharger onto a correction of the activation duration. Mathematically speaking, it is a mapping of space $R^3$ to R. In order to be able to read out the value for the correction to the injection duration in this variant, the ECU 10 must additionally have knowledge in relation to the operating point of the internal combustion engine. This knowledge is practically always present in an ECU 10, however.

Figure 4:
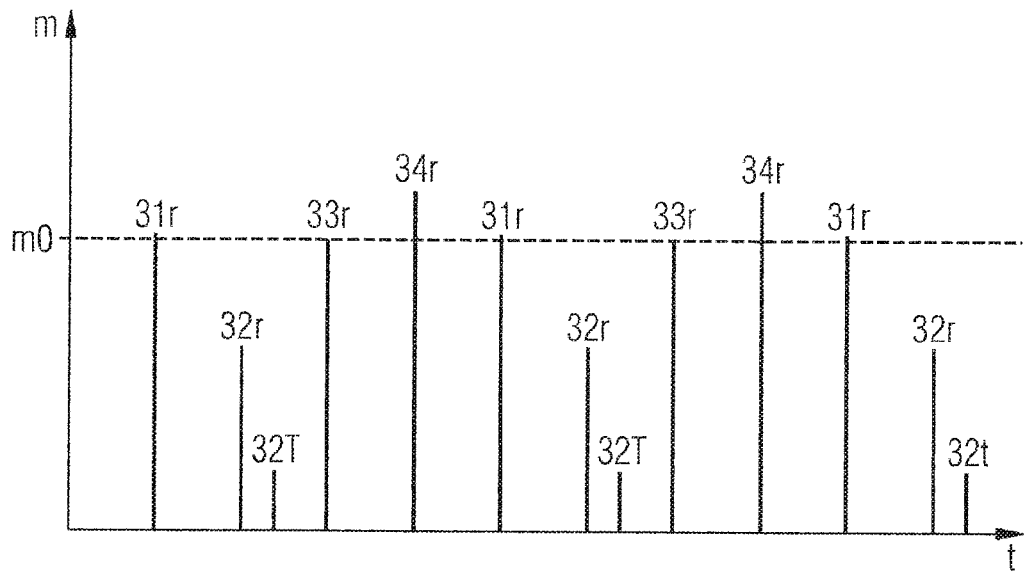
FIG. 4 shows injection patterns for four injectors, with the activation of one injector being corrected and another injector performing a test injection.

FIG. 4 shows the sequence of injections into the four cylinders 51, 52, 53, 54 of the internal combustion engine, the activation of the injector 31 having been adjusted in accordance with the correction of the activation duration determined in the engine characteristic map 14 so that the target injection quantity m0 is achieved. Analogously to the above-described procedure for the injector 31, the activation of the injector 32 is now corrected. In this case the rotational speed of the turbocharger is once again measured first at an operating point without test injection and then with test injection 32T, which is performed by the injector 32. The value for the correction of the injection duration associated with the change in rotational speed is once again read out from the engine characteristic map 14.

Figure 5:
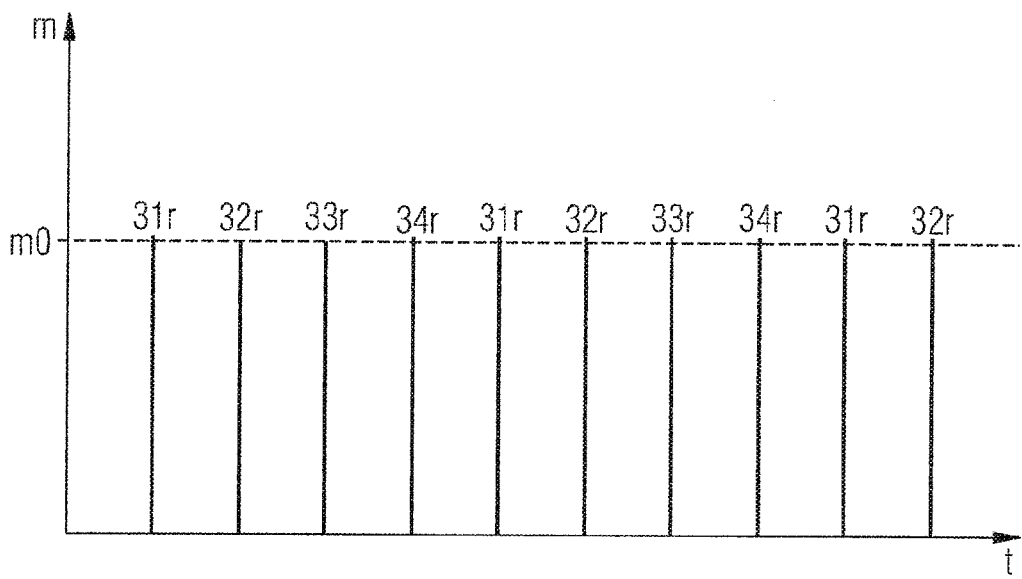
FIG. 5 shows an injection pattern with corrected activations.

FIG. 5 shows the injection patterns of the injectors 31, 32, 33, 34 after each injector 31, 32, 33, 34 has been set sequentially. It can readily be seen here that all of the injectors 31, 32, 33, 34 now produce the same injection quantities. It should be noted here in addition that the invention is not, of course, restricted to engines having four cylinders.

It should also be mentioned that a test injection does not need to be torque-neutral, since the effects of reduced heat production due to work being done at the piston can also be taken into account in an engine characteristic map by means of simulations or tests.

It is noted that a test injection does not need to be a separate injection. Thus, it is also possible, for example, initially to measure the first rotational speed, as described in relation to FIG. 2. Instead of as shown in FIG. 3, however, a separate injection 31T is not performed by the injector 31 in order to determine a second rotational speed, but instead the injections 31r are extended by a defined period of time. A change in the rotational speed of the turbocharger measurable thereby can also be used by means of a suitably measured engine characteristic map in order to adjust the activation of the injector 31.

A control parameter of the injection system, such as, for example, the correction of the injection duration, does not need to be stored as a factor. Equally, the correction can be carried out using a summand or some other suitable mathematical function.

The injection quantity can be corrected not just by way of the injection duration; rather, correcting the injection quantity is also possible via a level of a control signal for an injector, for example via the voltage curve of the control signal.

It should also be mentioned that the invention is not limited to a determination of a single correction parameter per injector, such as, for example, the change in rotational speed stored in the memory area 21c. It is equally easily possible to determine and store a plurality of correction parameters for an injector, for example as a multidimensional engine characteristic map in which the changes in rotational speed which come about in the turbocharger as a result of a test injection for different operating points of the internal combustion engine and for different rail pressures are measured by means of the method according to various embodiments.

The invention claimed is:

1. A method for determining an operating characteristic of an injection system of an internal combustion engine, wherein the internal combustion engine includes a turbocharger, the method comprising the method steps:
    A) Performing a test injection of fuel into a cylinder of the internal combustion engine by means of the injection system;
    B) determining an operating parameter of the turbocharger;
    C) determining an operating characteristic of the injection system on the basis of the determined operating parameter of the turbocharger.

2. The method according to claim 1, wherein the operating parameter of the turbocharger is a rotation parameter or a turbocharger rotational speed or a variable which can be derived from a turbocharger rotational speed.

3. The method according to claim 1, wherein the operating characteristic of the injection system is an injection quantity or a variable which can be derived from an injection quantity or a control parameter of the injection system.

4. The method according to claim 1, wherein the method steps A) to C) are performed for a plurality of test injections.

5. The method according to claim 1, wherein the test injection or the test injections is or are performed in a torque-neutral manner.

6. The method according to claim 1, wherein a calibration of the injection system is carried out on the basis of the determined operating parameter.

7. The method according to claim 1, wherein a deviation of the determined operating parameter from a target value is used in order to achieve the same or a different target value with greater precision in a subsequent injection.

8. The method according to claim 1, wherein the method is performed for a plurality of cylinders of the internal combustion engine or for all cylinders of the internal combustion engine.

9. The method according to claim 1, wherein
the method is used in order to achieve maximally homogeneous injection patterns into different cylinders.

10. A device for determining an operating characteristic of an injection system, comprising:
   a) an injector-side interface for controlling an injection system;
   b) a turbocharger-side interface for receiving an operating parameter of the turbocharger;
   c) an electronic circuit which is embodied in such a way that an operating characteristic of the injection system can be determined on the basis of the operating parameter received on the turbocharger side.

11. The device according to claim 10, wherein
the operating parameter of the turbocharger is a rotation parameter or a turbocharger rotational speed or a variable which can be derived from a turbocharger rotational speed.

12. The device according to claim 10, wherein
the operating characteristic of the injection system is an injection quantity or a variable which can be derived from an injection quantity or a control parameter of the injection system.

13. The device according to claim 10, wherein
the test injection can be performed in a torque-neutral manner.

14. The device according to claim 10, wherein
the electronic circuit is embodied in such a way that a calibration of the injection system can be carried out on the basis of the determined operating parameter.

15. The device according to claim 10, wherein
a deviation of the determined operating parameter from a target value is used in order to achieve the same or a different target value with greater precision in a subsequent injection.

16. The device according to claim 10, wherein
test injections into a plurality of cylinders of the internal combustion engine or into all cylinders of the internal combustion engine, can be performed by means of the electronic control system.

17. The device according to claim 10, wherein
the electronic circuit is embodied in such a way that the injection system can be controlled by means of the electronic control system in such a way that, taking the determined operating characteristic into account, a maximally homogeneous injection pattern can be achieved for different cylinders or for all cylinders of the internal combustion engine.

18. An internal combustion engine comprising an engine block, an injection system, a turbocharger, a turbocharger measuring device and an electronic control system comprising:
   a) an injector-side interface for controlling an injection system operable to trigger a test injection into a cylinder of the internal combustion engine;
   b) a turbocharger-side interface for receiving an operating parameter of the turbocharger;
   c) an electronic circuit which is embodied in such a way that an operating characteristic of the injection system can be determined on the basis of the operating parameter received on the turbocharger side.

19. The device according to claim 10, wherein the injector-side interface triggers a test injection into a cylinder of the internal combustion engine.

20. The device according to claim 10, wherein
a deviation of the determined operating parameter from a target value is used in order to achieve
a designated fuel injection quantity with greater precision in the subsequent injection.

* * * * *